Dec. 18, 1934. C. L. STOKES Re. 19,401
AUTOMATIC FUEL REGULATOR
Original Filed Oct. 19, 1926
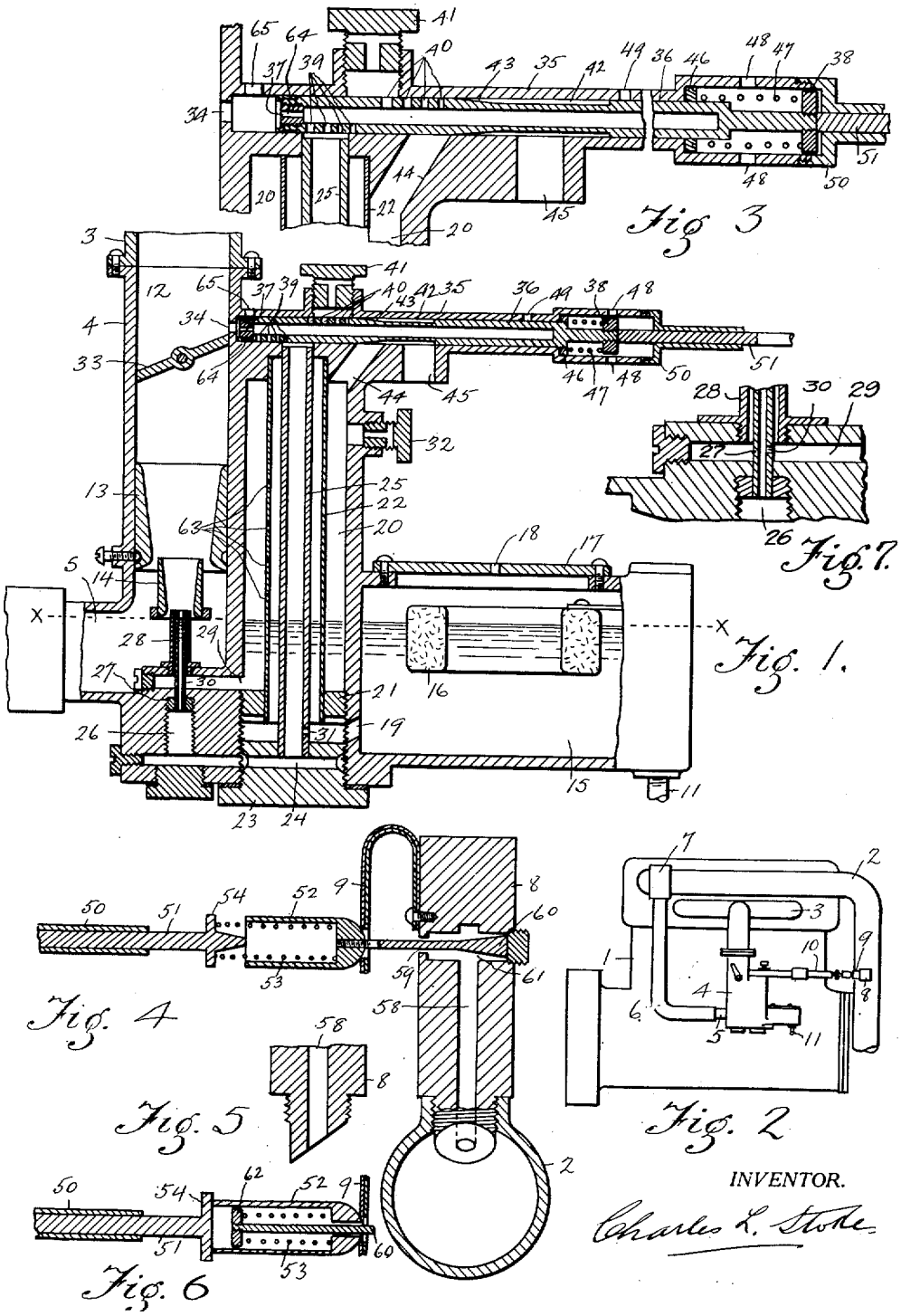
INVENTOR.
Charles L. Stokes Reissued Dec. 18, 1934

Re. 19,401

UNITED STATES PATENT OFFICE 19,401

AUTOMATIC FUEL REGULATOR

Charles L. Stokes, Beverly Hills, Calif., assignor, by mesne assignments, to Lynn A. Williams, Evanston, and Clifford C. Bradbury, Glencoe, Ill., successor trustees Original Application 1,861,725, dated June 7, 1932, Serial No. 142,761, October 19, 1926. Application for reissue March 13, 1933, Serial No. 660,554

15 Claims. (Cl. 123—119)

My invention relates to improvements in automatic fuel regulators for governing the supply of fuel to an internal combustion engine. The principal object of my invention is to provide a carburetor for internal combustion engines which will give the optimum proportions of fuel and air to the engine for carbureting the same in accordance with the varying temperatures of the engine.

Another object of my invention is to provide a carburetor for an internal combustion engine so that the same may be started and operated by proper carburetion to the end that no manual choking, or priming, is necessary, the carburetion depending solely on functions of the engine itself, that is, depending on the degree of vacuum in the engine and its temperature.

Another object of my invention is to provide a thermostatically controlled carburetor.

Another object is to provide a carburetor of cheap and efficient structure.

This application is a continuation in part of my copending applications, Serial No. 67,864 filed November 9, 1925, now Patent No. 1,764,659 issued June 17, 1930; and Serial No. 106,012 filed May 1, 1926.

Referring to the drawing, in which the same numbers indicate like parts;

Fig. 1 is a vertical sectional view of a carburetor embodying my invention;

Fig. 2 is a view showing the carburetor in its relation to an internal combustion engine;

Fig. 3 is an enlarged sectional view of part of Fig. 1 at starting positions;

Fig. 4 is a transverse sectional view of part of Fig. 2 showing the thermostat and the mounting therefor;

Fig. 5 is a sectional detail of part of Fig. 4;

Fig. 6 is an alternative construction for part of Fig. 4; and

Fig. 7 is an enlarged fragmentary sectional view of the discharge nozzle.

Referring to Fig. 2, an internal combustion engine 1 is shown, having an exhaust pipe 2, an inlet pipe 3, and a carburetor 4 attached to the intake pipe 3, the air intake 5 of carburetor 4 being attached by a hot air pipe 6. A block 8 is fastened to exhaust pipe 2 and supports a bimetallic thermostat 9 for controlling at certain times the operation of carburetor 4 through a suitable mechanism 10. Carburetor 4 may be supplied with liquid fuel by any well known feed system through a pipe 11.

Referring to Figs. 1 and 3, carburetor 4 includes an air intake 5 and a mixing chamber 12 of the usual circular cross section, the mixing chamber 12 containing a large venturi 13 and a small venturi 14, the outlet of the latter being adapted to reach the throat of large venturi 13. Liquid fuel supplied through pipe 11 passes through a valve (not shown) to a fuel reservoir 15, the liquid level therein being controlled by a float 16 attached to the valve in a well known manner. Reservoir 15 has a cover 17 and is open to atmosphere through a vent 18.

Liquid fuel from reservoir 15 passes through a passage 19 to the lower part of a well 20 of circular cross section. The well 20 is divided above the passage 19 into two parts by means of a plug 21 supporting a pipe or tube 22 in such a manner that liquid fuel will rise to static level interiorly of tube 22. The bottom of the well 20 is closed by a plug 23 having a fuel passage 24 therethrough, the plug 23 supporting a pipe 25 which passes through the interior of pipe 22. Passage 24 is adapted to connect with a passage 26 wherein is set a nozzle 27 concentric with the second nozzle 28, the discharge of both nozzles being substantially at the throat of small venturi 14 and slightly above the static liquid level X—X. A passage 29 supplies nozzle 28 with liquid fuel and air from the upper part of well 20. Nozzle 27 has a small orifice 30 therein adapted to connect passage 29 with passage 26.

Liquid fuel is supplied to the interior of tube 25 through an orifice 31. The tubes 22 and 25 fit in recesses in the metal of carburetor 4 at the upper end of well 20. The upper part of well 20 is open to atmosphere through a high speed regulating valve 32, and at times through a port 44, as will presently appear.

A throttle 33 is placed in mixing chamber 12 for the purpose of controlling the main supply of liquid fuel and air to engine 1. Above the closing point of throttle 33 an orifice 34 is placed for connecting mixing chamber 12 with the interior of a casing 35 which may form an extension of the body of carburetor 4. In casing 35 a valve 36 is adapted to reciprocate, the same being reduced at one end to an orifice 37 of predetermined size, the other end terminating in a threaded portion on which is a nut 38.

At the proper points along valve 36 are placed groups of liquid feed orifices 39 and groups of air supply orifices 40, adapted to supply liquid fuel and air to the interior of valve 36. The amount of air which may pass through the orifices 40 is partially controlled by an air regulating valve 41, as well as by the position of the valve 36 with respect to the valve 41. The position of orifice 39 of valve 36 with respect to the tube 25 partially controls the discharge of fuel from the tube 25 into casing 35. Valve 36 is provided with an annular space 42 having a tapered portion 43 which is adapted to connect the upper part of well 20 to the atmosphere through passage 44 and port 45. The outer end of valve 36 is squared to work through a guide 46 in order to maintain orifices 39 and 40 in the proper relation to the discharge from tube 25 and valve 41. Casing 35 is expanded at guide 46 to hold a spring 47 encircling the end of valve 36 and pressing against nut 38, there being a suitable clearance between nut 38 and the interior of casing 35. The expanded portion of casing 35 is open to atmosphere through port 48 and has a threaded orifice 49 for the insertion of a pin or set screw or other locking means for holding valve 36 in predetermined position when desired to make a starting apparatus inoperative. On the outer end of casing 35 an extension 50 is threaded for guiding the rod 51 which is adapted to be actuated by the movement of thermostat 9 responsive to the heat of engine 1, through a cup-shaped member 52 within which a spring 53 closely fits for contacting with the enlarged head 54 on rod 51.

It will be noted that spring 53 extends outside of member 52 to the end that a portion of spring 53 outside of member 52 shall form a flexible contact having more or less universal movement in case of misalignment, and that spring 47 is stiffer than spring 53.

Thermostat 9 is fastened to block 8, which is threaded into exhaust pipe 2. One end of block 8 is cut at an angle to receive the impact of heated exhaust gases which pass through passage 58 in block 8 and deflect the same to escape to atmosphere, at times through a port 59 controlled by the movement of a valve 60. The valve 60 is suitably fastened to member 52 and is adapted to be actuated by the movement thereof responsive to the movement of thermostat 9. It should be noted that clearance between the valve 60 and the walls of the passage 61 is allowed for equalizing the pressure on valve 60 until the same closes port 59 under the influence of thermostat 9.

An alternative construction, as shown in Fig. 6, illustrates that member 52 slides freely on the end of valve 60, which is threaded to receive a nut 62 interiorly of member 52 for holding spring 53 therein. The end of member 52 is adapted to abut the head 54. This construction permits thermostat 9 to seat valves 60 and 36 flexibly against the resistance of springs 47 and 53, it being understood that while rod 51 is shown as straight, for straight line motion, casing 50 may be curved and rod 51 may be wire, as is well known in Bowden wire mechanisms.

*Operation*

Referring particularly to Figs. 1 to 5 inclusive and 7, and assuming that engine 1 is at low temperature and very cold, the thermostat 9 will be in contracted position, leaving port 59 wide open. At this time a plurality of the orifices 39 will be in registry with the tube 25, and probably one of the orifices 40 will be in registry with valve 41. The position of orifices 39 and 40 is due to spring 47 which forces rod 51 and member 52 through the medium of spring 53 into contact with thermostat 9, it being understood that there is always contact of head 54 with spring 53.

Upon cranking engine 1 with throttle 33 closed a high partial vacuum will be developed in chamber 12 on the engine side of throttle 33, which vacuum is applied through orifices 34, 37, and 39 for elevating liquid fuel standing at the static level X—X in pipe 25 and from the upper part of well 20 through passages 24 and 26, orifice 30 and passage 29. The upper part of well 20 and pipe 25 constitute a reservoir of such capacity, together with the passages 24 and 26 and with liquid fuel flowing through orifice 30, that the column of liquid fuel in tube 25 will be maintained substantially solid so that under the starting conditions described there will be a very large proportion of liquid fuel drawn through orifices 39 to the cylinders of engine 1 for priming and starting the same, it being understood that during the cranking period the resistance of spring 47 will be sufficient to maintain the valve 36 in substantially fixed position.

As soon as the very rich priming charge has been fired and the engine starts to idle, there is a decided increase in vacuum in chamber 12 due to increased piston speed, the throttle 33 remaining in closed position. This sudden increase in vacuum causes valve 36 to move toward chamber 12 a certain distance whereby one or more of the orifices 39 is shrouded in casing 35, thus reducing the richness of the priming mixture to a rich mixture for operating engine 1.

Engine 1, continuing to operate the hot exhaust gases, will pass to atmosphere through exhaust pipe 2 and impinge on their way on the face of block 8 whereby a portion of the hot gases will be deflected through passage 58 and port 59 to strike thermostat 9. Thereupon thermostat 9 commences to expand and with the continued operation of engine 1 causes the continued movement of rod 51 through contact with member 52 and spring 53 until maximum expansion is reached.

At the same time as the shrouding of orifices 39 one or more of the orifices 40 are exposed to atmosphere through valve 41. The richness of the mixture is thus reduced in two ways, first, by actually cutting off the liquid supply through the shrouding of one or more orifices 39, and secondly, by reducing the suction applied to the remaining orifices by the introduction of an increasing amount of air through orifices 40.

Upon the continued operation of engine 1 the same will finally reach an optimum operating temperature whereby thermostat 9 will reach its maximum expansion and valve 36 will be seated in the end of casing 35 over orifice 34, leaving only one of the orifices 39 for connecting the interior of valve 36 with the discharge from pipe 25. This remaining orifice will be very small and will be used as an idling orifice at optimum engine operating temperatures. The idling mixture may then be adjusted by means of valve 41.

The device is so proportioned that generally when idling one end of the liquid column in nozzle 27, passages 26 and 24, and tube 25 will not come lower than the bottom of passage 26, the demand for liquid fuel through orifices 39 during the initial priming period, as described, being sufficient only to reduce the liquid level to this extent. Thereafter, upon shrouding some of the orifices 39 as described, the demand for liquid fuel through the remaining orifices may be more than supplied through orifice 31, whereupon the liquid level in passages 26 and 27 will gradually increase until it reaches the static level X—X at which time fuel will be supplied only through the smallest and last of the orifices 39.

In this manner it will be seen that a very rich priming charge is first supplied to the engine and thereafter as soon as the priming charge is fired the richness of the mixture is cut down and gradually reduced to normal as optimum engine operating temperatures are reached.

Now upon opening throttle 33 wide, a sudden drop in vacuum to substantially atmospheric pressure will ensue in chamber 12 and within valve 36 because the capacities of orifices 40 are much greater than that of orifice 37, so that the column of liquid fuel being held up as described in tube 25 will thereupon drop and be forced from the top of nozzle 27 above the static liquid level X—X. This discharge of liquid fuel into the air stream is accelerated by the sudden increase in vacuum at the throat of venturi 14 due to the sudden increase in velocity of air responsive to the sudden opening of throttle 33.

Engine 1 thereupon receives an accelerating charge which tends to empty tube 25 and nozzle 27. Thereafter a proportion of the liquid fuel for running the engine will be supplied through orifice 31 responsive to the suction at the throat of venturi 14. The sudden increase in suction at the throat of venturi 14 also reacts on nozzle 28 to withdraw liquid fuel standing in the upper part of well 20, and thereafter as soon as the upper part of well 20 and nozzle 28 are emptied the vacuum at the throat of venturi 14 will be applied through nozzle 28, orifice 30 and passage 29 to the interior of well 20, and through a plurality of orifices 63 to the interior of tube 22 for raising the liquid level therein and causing a flow of liquid fuel through one or more of the orifices 63 for supplying engine 1 under varying conditions of load and speed. It will be noted that orifices 63 are all above the static liquid level X—X, this being desirable in order that at starting periods there shall be no more liquid fuel supplied to well 20 than that which can pass through orifice 30.

The vacuum at the throat of venturi 14 will vary with variations of engine speed, thereby varying the height of the liquid column in tube 22, and thus varying the liquid fuel supplied through orifices 63. Since this variation is solely due to variations in vacuum responsive to the speed or load of engine 1 the same may be regulated for high speed work by adjustment of regulating valve 32.

In addition, at starting speeds, if it is desired to accelerate, thermostat 9 being fully contracted, a sudden drop in vacuum in chamber 12 caused by sudden opening of throttle 33 will not only cause the liquid column in tube 25 to drop and discharge as heretofore described, but will permit a sudden recession of valve 36 for opening all of the orifices 39 to tube 25. This recession of valve 36 causes atmosphere to be cut off from the upper part of well 20 through grooves 42, 43 and passages 44, 45. Thus in cold weather and under similar conditions of acceleration and operation a greater or less degree of vacuum will be automatically applied by the movement of valve 36 to the interior of well 20 for causing an increased feed through orifices 63 for high speed work when the engine is cold.

It will be noted that block 8 may be cast integral with pipe 2 and contains considerable metal, thus forming a reservoir for heat whereby on stopping the engine after thermostat 9 has reached maximum expansion the orifices 39 will be gradually uncovered only in proportion to the rate of heat loss. Thus a proportionate priming charge will be supplied to engine 1 depending on its temperature as well as a proportionate accelerating and operating mixture. Thermostat 9 and block 8 may be shrouded by a cover (not shown) to reduce the rate of cooling. Passage 58 is provided for giving a rather quick initial expansion to thermostat 9 and bringing block 8 rapidly up to temperature as it is desirable that a time element be involved whereby some of the orifices 39 should supply liquid fuel for not too long a period.

It will be noted that the vacuum for drawing liquid fuel up and maintaining the same for accelerating in tube 25 is applied through valve 36 and casing 35 which provide passages for liquid fuel and air. For good construction it is found that valve 36 should be moved not more than ⅜ of an inch, this being advisable on account of the maximum desirable expansion of the bi-metallic thermostat 9 which, if exceeded, causes undue stresses in the metal thereof and causes the same to operate inaccurately.

At other positions of throttle 33 between starting and accelerating as described for varying speeds of engine 1, the supply of liquid fuel from orifices 63 will vary according to the degree of vacuum at the throat of venturi 14, but, as already stated, orifices 63 should preferably be above the static liquid level X—X so that there will be a gradual overlapping and supply from orifices 31 and 63. The upper part of well 20 is adapted to be gradually filled through orifice 30 when the engine 1 is not in operation, although the carburetor is entirely operative if some of the orifices 63 are below the level X—X.

After the accelerating discharge from tube 25 takes place the liquid fuel is drawn through orifice 31 and a small amount of air through orifices 40 and the idling orifice 39, valve 36 being at its innermost position due to the action of thermostat 9. Air and liquid fuel will be drawn from well 20 through orifices 63 and/or passage 44 and valve 32, and thus two separate columns of liquid fuel and air or equalizations of liquid fuel and air will discharge from nozzles 24 and 28 to mix at the throat of venturi 14. This action gives good atomization and carburetion.

Carburetor 4 may be used as a non-thermostatically controlled carburetor simply by inserting a locking pin or set screw in orifice 49 whereby valve 36 will be held in its innermost position. Valve 36 is freely fitted in casing 35. Should there be a tendency of fuel to leak around valve 36 through orifice 34 due to engine vacuum, a groove 64 may be cut in valve 36 for registering with an atmospheric port 65 when valve 36 is held in its innermost position, so that air instead of liquid fuel will be drawn into the mixing chamber 12 from around said valve.

It will be understood that valves 32 and 41 may be replaced by set orifices and also that upon opening throttle 33 wide the reciprocation of valve 36 is governed by the difference in the strength of spring 47 and thermostat 9 and may permit one or more of the orifices 39 to register with the discharge from tube 25 so that atmospheric pressure through orifices 40 will have quicker access to the interior of tube 25 for permitting the liquid fuel therein to drop more rapidly for supplying nozzle 27.

When the liquid fuel in tube 25 drops for sudden acceleration it will be understood that the capacity of tube 25 is sufficient for the purpose of providing an accelerating charge over and above the amount which normally leaks back through orifice 31. As before stated, the discharge from tube 25 is due not only to the head of liquid therein over and above the static liquid level X—X, but also in part to the sudden increase in vacuum at the throat of venturi 14, although the initial discharge is believed to be solely due to the head of liquid in tube 25.

Having thus described my invention what I claim as new and desire to protect by Letters Patent of the United States is:

1. In a carburetor, a mixing chamber, a throttle controlling the outlet from the mixing chamber, a liquid fuel reservoir, a well between the mixing chamber and reservoir divided into two parts and supplied with liquid fuel from the reservoir, a liquid feed passage supplied from the well having its ends discharging into the mixing chamber one on each side of said throttle and a second liquid feed passage supplied from the upper part of the well and discharging into the mixing chamber.

2. The combination with an internal combustion engine of a carburetor having a mixing chamber, a throttle controlling the outlet from the mixing chamber, a liquid fuel reservoir, a well between the mixing chamber and reservoir and supplied with liquid fuel from the reservoir, a liquid feed passage supplied from the well having its ends discharging into the mixing chamber one on each side of said throttle, and means responsive to engine vacuum and temperature for controlling the discharge from said passage.

3. The combination with an internal combustion engine of a carburetor having a mixing chamber, a throttle controlling the outlet from the mixing chamber, a liquid fuel reservoir, a well between the mixing chamber and reservoir divided into two parts and supplied with liquid fuel from the reservoir, a liquid feed passage supplied from the well having its ends discharging into the mixing chamber one on each side of said throttle, a second liquid feed passage supplied from the upper part of the well and discharging into the mixing chamber and means to supply air to the second passage.

4. The combination with an internal combustion engine of a carburetor having a mixing chamber, a throttle controlling the outlet from the mixing chamber, a liquid fuel reservoir, a well between the mixing chamber and reservoir divided into two parts and supplied with liquid fuel from the reservoir, a liquid feed passage supplied from the well having its ends discharging into the mixing chamber one on each side of said throttle, a second liquid feed passage supplied from the upper part of the well and discharging into the mixing chamber, means to supply air to said second passage, and means responsive to the engine vacuum to control said air supply.

5. The combination with an internal combustion engine of a carburetor having a mixing chamber, a throttle controlling the outlet from the mixing chamber, a liquid fuel reservoir, a well between the mixing chamber and reservoir divided into two parts and supplied with liquid fuel from the reservoir, a liquid feed passage supplied from the well having its ends discharging into the mixing chamber one on each side of said throttle, a second liquid feed passage supplied from the upper part of the well and discharging into the mixing chamber, means to supply air to said second passage, and means responsive to the engine temperature for controlling said air supply.

6. The combination with an internal combustion engine of a carburetor having a mixing chamber, a throttle controlling the outlet from the mixing chamber, a liquid fuel reservoir, a well between the mixing chamber and reservoir divided into two parts and supplied with liquid fuel from the reservoir, a liquid feed passage supplied from the well having its ends discharging into the mixing chamber one on each side of said throttle, a second liquid feed passage supplied from the upper part of the well and discharging into the mixing chamber and means responsive to engine vacuum and temperature for supplying air to the second passage.

7. The combination with an internal combustion engine of a carburetor having a mixing chamber, a throttle controlling the outlet from the mixing chamber, a liquid fuel reservoir, a well between the mixing chamber and reservoir and supplied with liquid fuel from the reservoir, a liquid feed passage supplied from the well having its ends discharging into the mixing chamber one on each side of said throttle, and means actuated by engine temperature to supply air to said passage.

8. The combination with an internal combustion engine of a carburetor having a mixing chamber, a throttle controlling the outlet from the mixing chamber, a liquid fuel reservoir, a well between the mixing chamber and reservoir and supplied with liquid fuel from the reservoir, a liquid feed passage supplied from the well having its ends discharging into the mixing chamber one on each side of said throttle, and means actuated by engine vacuum and temperature to supply air to said passage.

9. A carburetor having a mixing chamber, a liquid fuel reservoir, a throttle controlling the outlet from the mixing chamber, two wells between the reservoir and mixing chamber and connected to each, each well being provided with an air port, and a single means responsive to temperature and vacuum variations for controlling the admission of air to both wells.

10. A carburetor having a mixing chamber, a liquid fuel reservoir, a throttle controlling the outlet from the mixing chamber, two wells between the reservoir and mixing chamber and connected to each, said wells being concentric, and means responsive to engine temperature and vacuum for controlling the admission of air to both wells.

11. The combination with an internal combustion engine of a carburetor having a mixing chamber, a liquid fuel reservoir, a throttle controlling the outlet from the mixing chamber, two wells between the reservoir and mixing chamber and connected to each, an air port for each well, and means controlled jointly by the engine vacuum and temperature for controlling the admission of air through said ports to both wells.

12. The combination with a carburetor of an internal combustion engine having a mixing chamber and a throttle controlling the outlet therefrom, a fuel well, means for supplying a rich mixture of fuel and air to the posterior side of said throttle when said engine is cold comprising a passageway and a valve cooperating with said passageway and movable through a plurality of successive positions depending on the temperature and vacuum of said engine, each of said successive positions varying the mixture of fuel and air flowing through said passageway, and means for supplying fuel to the anterior side of said throttle from the other end of said well when said throttle is in an open position.

13. In combination with the carburetor of an internal combustion engine having a mixing chamber and a throttle controlling the outlet therefrom, of a fuel reservoir, means for supplying fuel and air to the posterior side of said throttle when said engine is being started and is cold, means for varying the proportions of fuel and air supplied to said engine as said engine comes up to an idling speed, comprising a valve having a plurality of fuel and air ports and operable in response to variations in temperature and vacuum in said engine.

14. In combination with the carburetor of an internal combustion engine having a mixing chamber and a throttle controlling the outlet therefrom, means for supplying fuel to the posterior side of said throttle comprising a valve having a plurality of air and fuel ports, a bimetallic thermostat operable responsive to the temperature variations of said engine, and means for reciprocating said valve responsive to said thermostat.

15. In an internal combustion engine the combination of a carburetor having a mixing chamber with a throttle for controlling the outlet therefrom, a fuel well, means for supplying fuel and air to the posterior and anterior sides of said throttle from opposite ends of said well respectively, and a valve member for controlling the flow of fuel and air to the posterior side of said throttle movable in response to temperature and vacuum variations in said engine.

CHARLES L. STOKES.